United States Patent [19]

Tsukai et al.

[11] Patent Number: 5,710,749
[45] Date of Patent: Jan. 20, 1998

[54] METHOD AND APPARATUS FOR DETERMINING AN OPTICAL DISC TYPE

[75] Inventors: Yoshiyuki Tsukai; Masanori Suzuki, both of Saitama, Japan

[73] Assignee: Pioneer Electronic Corporation, Tokyo, Japan

[21] Appl. No.: 613,206

[22] Filed: Mar. 6, 1996

[30] Foreign Application Priority Data

Mar. 10, 1995 [JP] Japan .................................. 7-051453

[51] Int. Cl.⁶ .................................................. G11B 7/00
[52] U.S. Cl. .................................................. 369/58
[58] Field of Search ........................... 369/44.25, 44.26, 369/44.27, 44.29, 54, 58; 250/201.1, 201.5, 559.01, 559.39

[56] References Cited

U.S. PATENT DOCUMENTS

| 5,390,160 | 2/1995 | Sasaki ..................... 369/58 X |
| 5,428,592 | 6/1995 | Endo ....................... 369/58 X |
| 5,452,279 | 9/1995 | Yokota et al. ............ 369/58 X |

*Primary Examiner*—W. R. Young
*Attorney, Agent, or Firm*—Morgan, Lewis & Bockius LLP

[57] ABSTRACT

A method and apparatus for determining an optical disc type. A light beam is directed at an optical disc, and a focal point of the light beam moves in a focus direction with respect to the optical disc. An intensity of a reflection of the light beam from the optical disc is detected during the movement of the focal point of the light beam. A time interval between occurrences of a plurality of peaks of the detected intensity of the reflected light beam is detected, and the optical disc type is determined according to the detected time interval.

10 Claims, 7 Drawing Sheets

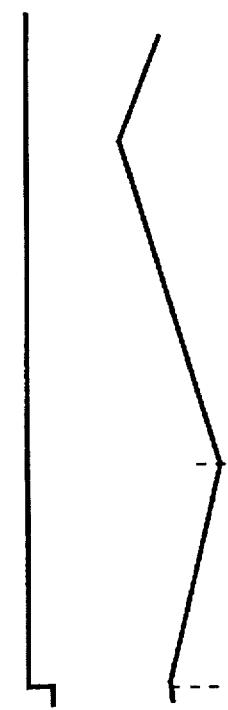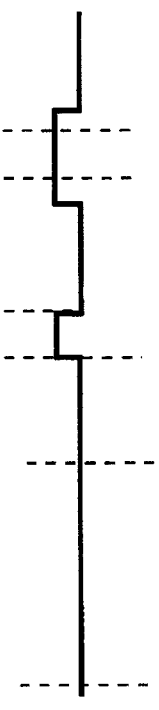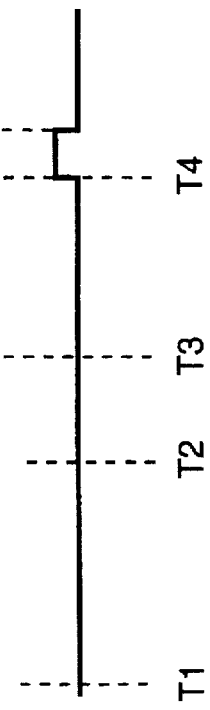
FIG. 5(A) THE OUTPUT FROM THE SYSTEM CONTROLLER TO THE LENS DRIVE CIRCUIT
FIG. 5(B) THE LEVEL OF THE LENS DRIVE SIGNAL
FIG. 5(C) THE OUTPUT FROM THE LENS DRIVE CIRCUIT TO THE DISC TYPE DETERMINING CIRCUIT
FIG. 5(D) THE LEVEL OF THE READ-OUT SIGNAL
FIG. 5(E) THE OUTPUT OF THE COMPARATOR 40
FIG. 5(F) THE OUTPUT OF THE COMPARATOR 42

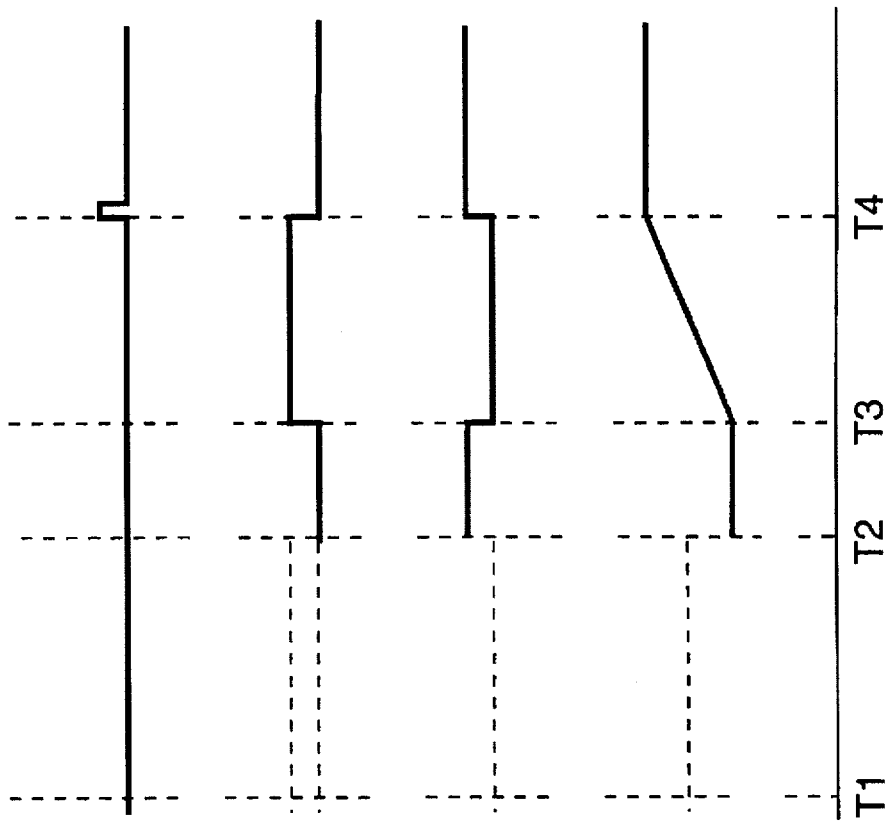

5,710,749

1

METHOD AND APPARATUS FOR DETERMINING AN OPTICAL DISC TYPE

BACKGROUND OF THE INVENTION

1. Field of the Invention

The present invention relates to a method and apparatus for determining an optical disc type.

2. Description of the Related Art

In a conventional optical disc player which can read different types of optical discs, the player must first determine the type of the disc to be read. Often, different types of discs, e.g., video discs and compact discs (CDs), have different diameters, and thus the conventional optical disc player determines the type of the disc to be read by detecting the diameter of the disc.

A problem arises, however, when the conventional disc player must distinguish between optical discs having the same diameter, e.g., CDs and digital video discs. In such cases, the conventional optical disc player cannot determine an optical disc type.

SUMMARY OF THE INVENTION

Accordingly, the present invention is directed to a method and apparatus for determining an optical disc type that substantially obviates one or more of the problems due to limitations and disadvantages of the related art. Additional features and advantages of the invention will be set forth in the description which follows, and in part will be apparent from the description, or may be learned by practice of the invention. The objectives and other advantages of the invention will be realized and attained by the structure and method particularly pointed out in the written description and claims hereof as well as the appended drawings.

To achieve these and other advantages and in accordance with the purpose of the invention, as embodied and broadly described, a method for determining an optical disc type is provided comprising the steps of directing a light beam at an optical disc, moving a focal point of the light beam in a focus direction with respect to the optical disc, detecting an intensity of a reflection of the light beam from the optical disc during the step of moving the focal point of the light beam, detecting a time interval between occurrences of a plurality of peaks of the detected intensity of the reflected light beam, and determining the optical disc type according to the detected time interval.

To further achieve these and other advantages and in accordance with the purpose of the invention, as embodied and broadly described, an apparatus for determining an optical disc type is provided comprising means for directing a light beam at an optical disc, means for moving a focal point of the light beam in a focus direction with respect to the optical disc, means for detecting an intensity of a reflection of the light beam from the optical disc during the movement of the focal point of the light beam, means for detecting a time interval between occurrences of a plurality of peaks of the detected intensity of the reflected light beam, and means for determining the optical disc type according to the detected time interval.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part this specification, illustrate embodiments of the invention and together with the description serve to explain the principles of the invention. In the drawings:

FIGS.5(A)–5(J) are waveform diagrams of the time-correlated change of output of the read-out signal level and the levels of the output signals from each element of the disc type determining circuit of FIG.2.

DETAILED DESCRIPTION OF THE PREFERRED EMBODIMENTS

Reference will now be made in detail to the preferred embodiments of the present invention, examples of which are illustrated in the accompanying drawings.

Figure 1:
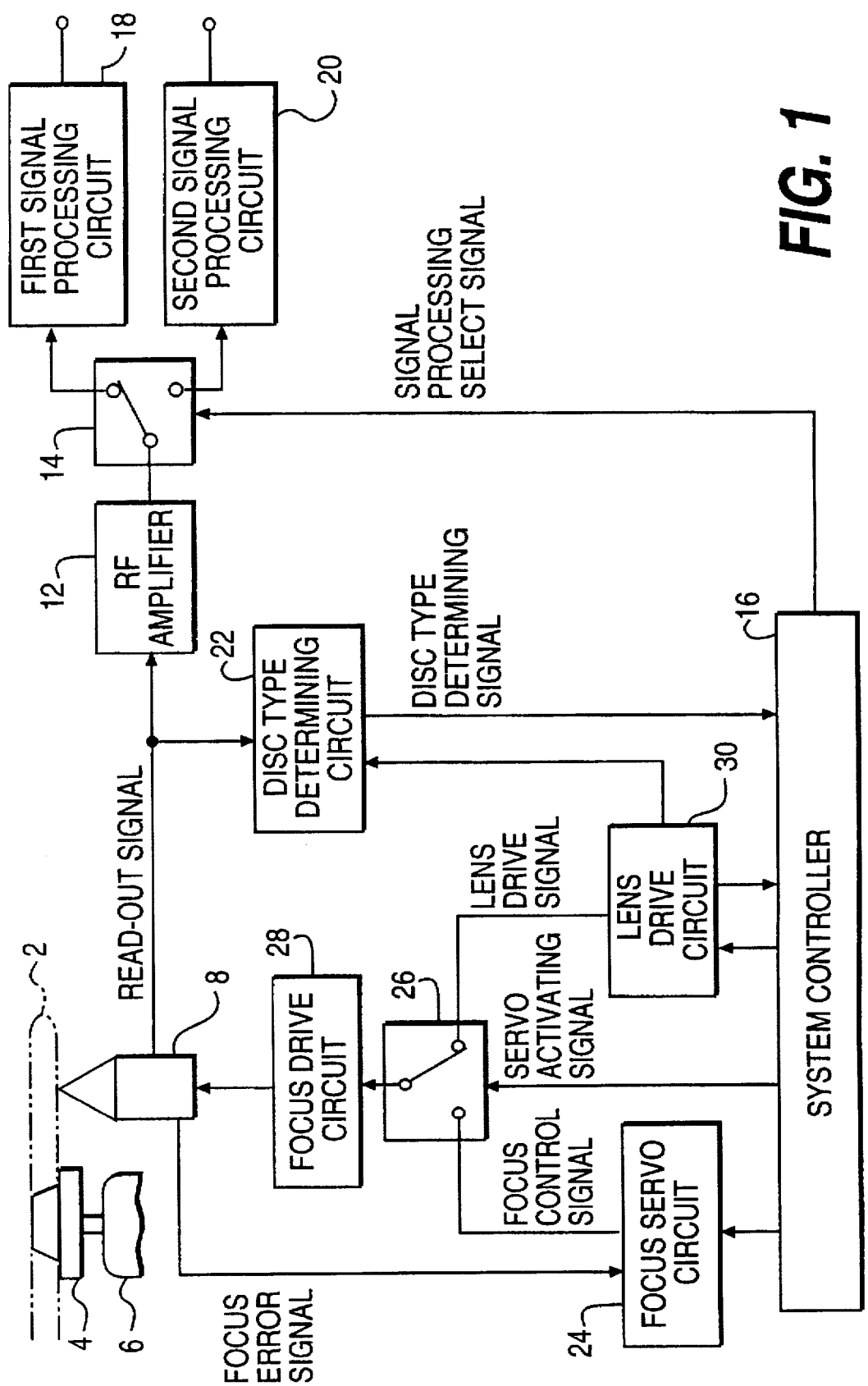
FIG.1 is a schematic block diagram of an optical disc player according to a preferred embodiment of this invention.

FIG.1 illustrates one embodiment of an optical disc player according to this invention. As shown in FIG.1, an optical disc 2 is held on a turntable 4 and rotated by a spindle motor 6. Information recorded on the disc 2 is read by an optical pick-up 8. The optical pick-up 8 comprises a laser diode which functions as a light source, an optical system including an objective lens Which functions as a focusing lens, a photo detector 10 (FIG.2) which includes four photo-diodes, 10a–10d for receiving a light beam reflected by the disc 2, a focus actuator for adjusting the position of the objective lens along its optical axis with respect to the information recording surface of the disc 2, and a tracking actuator for adjusting the position of the light beam generated by the laser diode in a radial direction of the disc 2 with respect to a information recording track of the disc 2.

The pick-up 8 produces a read-out signal by adding the output signals from each of the photo-diodes of the photo detector 10. A radio frequency (RF) amplifier 12 amplifies this read-out signal and provides the amplified read-out signal to a switch 14. The switch 14 provides the amplified read-out signal to either a first signal processing circuit 18 or a second signal processing circuit 20 in response to a signal processing select signal provided by a system controller 16. The first signal processing circuit 18 and the second signal processing circuit 20 process the amplified read-out signal in accordance with the type of the disc 2 located on the turntable 4 and reproduce the video signal or the audio signal corresponding to the information recorded on the disc 2.

The read-out signal produced by the pick-up 8 is also provided to a disc type determining circuit 22. The disc type determining circuit 22 determines the type of the disc 2 located on the turntable 4 based on the level of the read-out signal, and provides a disc type determining signal corresponding to the type of the disc 2 to the system controller 16.

The pick-up 8 further produces a focus error signal based on the output of the photo detector 10. This focus error signal is provided to a focus servo circuit 24 which produces a focus control signal for focus servo control based on the focus error signal and provides the focus control signal to a focus drive circuit 28 through a switch 26 controlled by the system controller 16. The focus drive circuit 28 is connected to a focus actuator (not shown) in the pick-up 8 and drives the focus actuator directly in response to the focus control signal.

The system controller 16 comprises a micro-computer for controlling each of the switches 14 and 26 based on internal software and the disc type determining signal. Specifically, the system controller 16 provides the signal processing select signal to the switch 14 in accordance with the disc type determining signal produced by the disc type determining circuit 22. Thus, the switch 14 connects one of the first and second signal processing circuits 18 and 20 to the RF amplifier 12 in accordance with the type of the disc 2. When the disc type determining signal is provided, the system controller 16 detects when the disc type determining process is finished, and after that, the system controller 16 generates a servo activating signal. The servo activating signal operates the switch 26 to connect the focus servo circuit 24 and the focus drive circuit 28 whereupon focus servo control begins.

The system controller 16 is connected to the focus servo circuit 24 and a lens drive circuit 30, and provides command signals to each. In particular, when the system controller 16 provides an appropriate command signal, the lens drive circuit 30 sends a lens drive signal to the focus drive circuit 28 through the switch 26 to thereby continuously move the objective lens in a desired focus direction. The switch 26 connects the lens drive circuit 30 to the focus drive circuit 28 when the disc player is activated, and connects the focus servo circuit 24 to the focus drive circuit 28 in response to the servo activating signal from the system controller 16.

Figure 2:
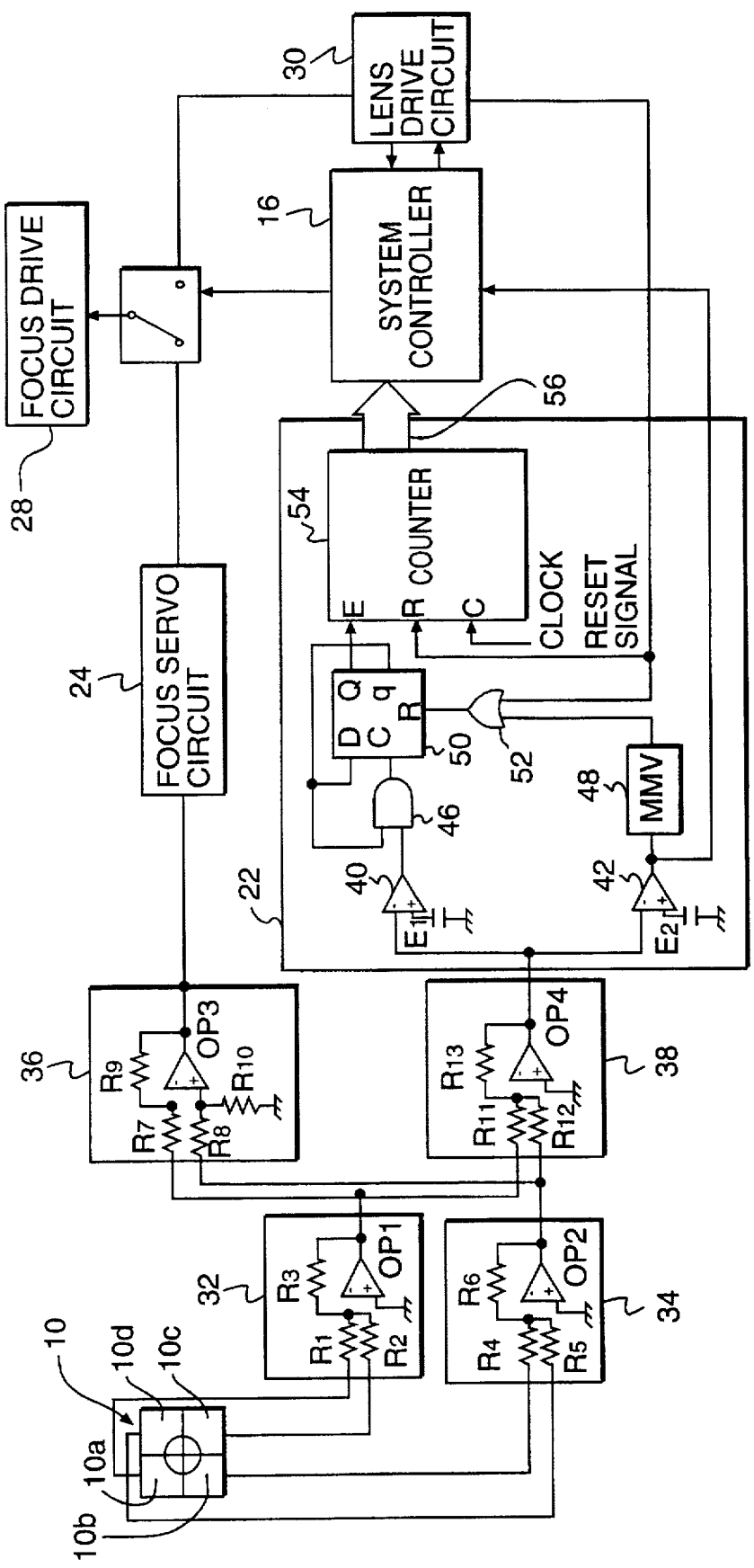
FIG.2 is a detail block diagram of the optical pick-up and the disc type determining circuit of FIG. 1.

FIG.2 is a detailed block diagram of the disc type determining circuit 22 along with peripheral elements of the optical disc player, including portions of the optical pick-up 8 and the system controller 16.

As shown in FIG.2, the four photo-diodes 10a–10d of the photo detector 10 are divided by a first division line which runs tangential to a track on the disc 2 and a second division line which runs perpendicular to the first division line. To ensure proper tracking of the disc 2, the photo detector 10 is positioned such that a light beam reflected from the disc 2 is centered within the light detector 10.

The output signals produced by the photo-diodes 10a and 10c are provided to an adder 32. The adder 32, which comprises resistors R1, R2, and R3 and an operational amplifier OP1, adds the output signals of the photo-diodes 10a and 10c. The output signals produced by the photo-diodes 10b and 10d are similarly provided to an adder 34. The adder 34, which comprises resistors R4, R5, and R6 and an operational amplifier OP2, adds the output signals of the photo-diodes 10b and 10d. The output signals produced by adders 32 and 34 are respectively provided to a subtracting circuit 36 and an adder 38.

The subtracting circuit 36, which comprises resistors R7, R8, R9, and R10 and an operational amplifier OP3, produces a subtract signal by subtracting the output of the adder 32 and the output of the adder 34. The subtracting circuit 36 provides this subtract signal to the focus servo circuit 24 as the focus error signal.

The adder 38, which comprises resistors R11, R12, and R13 and an operational amplifier OP4, produces an addition signal by adding the output of the adder 32 and the output of the adder 34. The adder 38 provides this addition signal to comparators 40 and 42.

The comparator 40 compares the level of the addition signal with a predetermined first reference level E1. When the level of the addition signal is greater than the reference level E1, the comparator 40 provides a logic value "1" to an AND-gate 46. When the level of the addition signal is less than the reference level E1, the comparator 40 provides a logic value "0" to the AND-gate 46.

The comparator 42 compares the level of the addition signal with a predetermined second reference level E2 which is higher than the reference level E1 (E2>E1). When the level of the addition signal is greater than the reference level E2, the comparator 42 provides a logic value "1" to a mono-stable multi-shot vibrator (MMV) 48. When the level of the addition signal is less than the reference level E2, the comparator 42 provides a logic value "0" to the MMV 48.

A flip-flop 50 outputs from its output terminal Q a signal having a logic value corresponding to the signal provided to its data input terminal D. This output signal is provided to an input terminal E of a counter 54 as a counter enable signal when the logic value of the signal provided to a clock input terminal C of the flip-flop 50 changes from logic value "0" to logic value "1". At that time, a negative counter enable signal, which has a logic value opposite that of the counter enable signal, is output from a negative output terminal q of the flip-flop 50. This negative counter enable signal is provided to the data input terminal D of the flip-flop 50 and the AND-gate 46. The AND-gate 46 provides a logic value "1" to the clock input terminal C of the flip-flop 50 only when the logic values of the output signal of the comparator 40 and the negative counter enable signal are both "1". On the other hand, the AND-gate 46 provides a logic value "0" to the clock input terminal C of the flip-flop 50 when at least one of the logic values of the output signal of the comparator 40 and the negative counter enable signal is "0".

The MMV 48 generates a reset pulse signal when the logic value of the signal provided from the comparator 42 turns from "0" to "1". This reset pulse signal is provided through an OR-gate 52 to a reset input terminal R of the flip-flop 50. When the flip-flop 50 receives the reset pulse signal, the flip-flop 50 is reset and outputs the counter enable signal having a logic value of "0" from its output terminal Q. In the meantime, the negative counter enable signal having a logic value of "1" is output from the negative output terminal q.

As described above, the counter 54 has an input terminal E to which the counter enable signal is applied from the flip-flop 50, an input terminal R to which a reset signal is applied from the lens drive circuit 30, and an input terminal C to which a clock signal is applied from a clock generator (not shown in figure). The counter 54 also has an output terminal which is connected through a data bus 56 to the system controller 16. The start and the stop of counting by the counter 54 are controlled by the output of the flip-flop 50, the counting is performed according to the clock signal, and a count value of the counter 54 is reset by the reset signal from the lens drive circuit 30.

The system controller 16 is connected also to the comparator 42. Thus, the system controller 16 receives the output of the comparator 42.

The lens drive circuit 30 generates the reset signal which is applied to the input terminal R of the counter 54 and the OR-gate 52 when a command signal is provided from the system controller 16.

Operation of the invention will now be described with reference to FIGS.3–4 and FIGS.5(A)–5(J).

Figure 3:
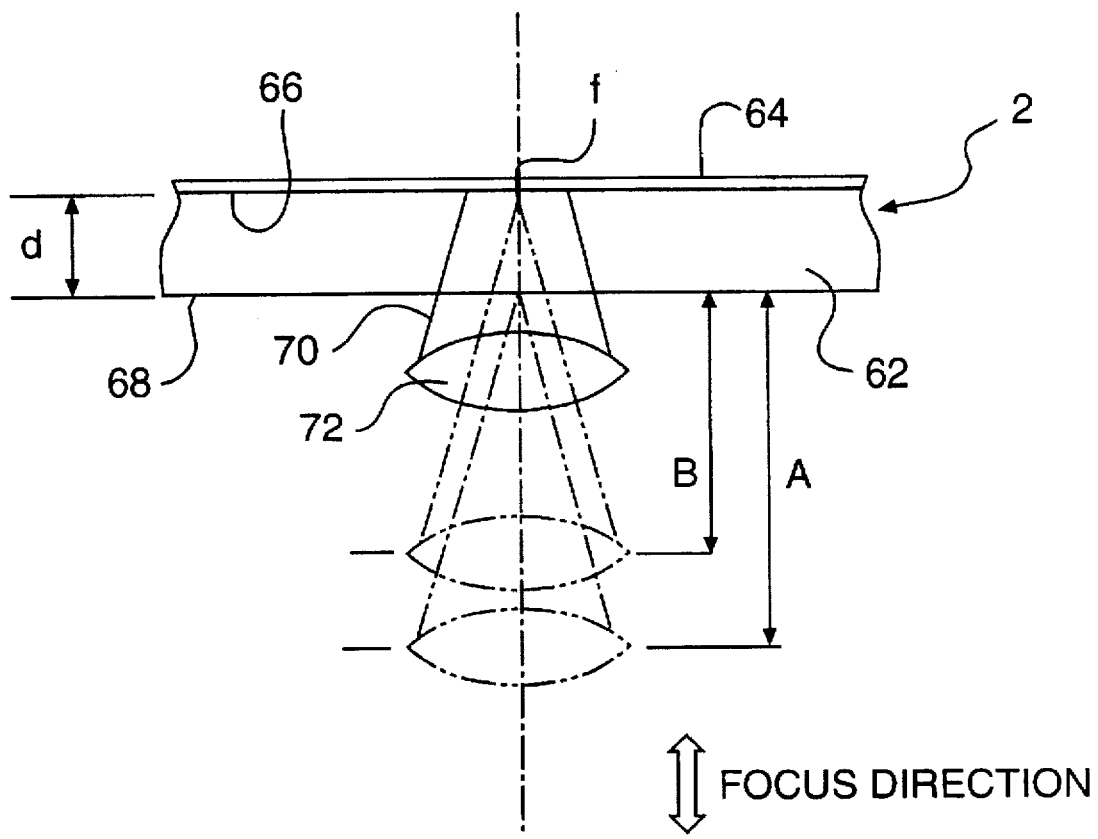
FIG.3 is a diagram illustrating a positional relationship between the objective lens of the optical pick-up and the optical disc on the turntable.
Figure 4:
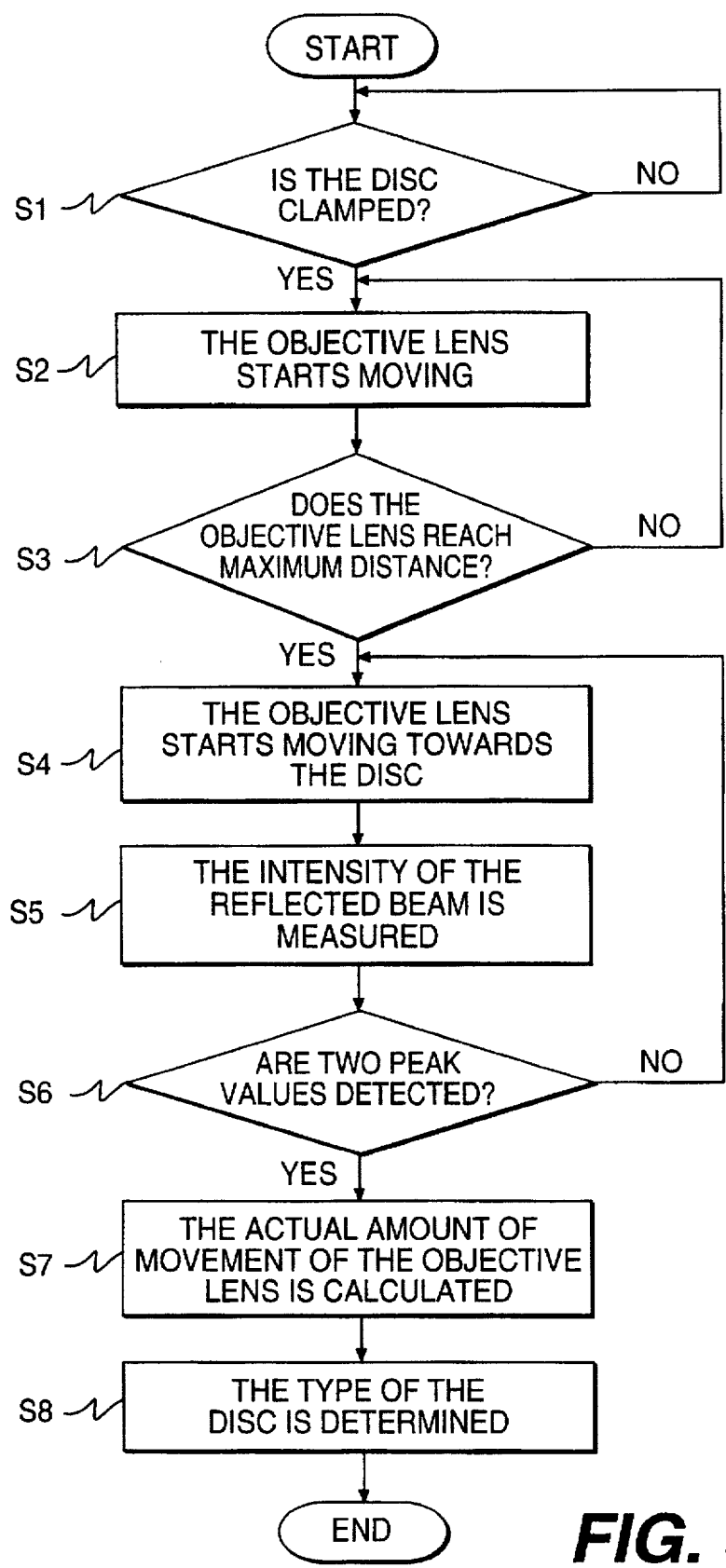
FIG.4 is a flow chart of an operation of the invention.

As shown in FIG.3, the optical disc 2, whose type is to be determined by the invention, comprises a clear plastic base plate 62 having a thickness d and a disc surface 68, and a metal reflective layer 64 having a reflective surface 66. The surface of the base plate 62 adjacent to the reflective surface 66 of the metal reflective layer 64 serves as an information recording surface.

An objective lens 72 of the optical pick-up 8 focuses the light beam 70 onto the reflective surface 66 of the metal reflective layer 64. The objective lens 72 focuses the light beam at a focal point f.

As shown in FIG.4 and FIGS.5(A)–5(J), when the disc 2 is clamped on the turntable 4 of the disc player (Step S1), the system controller 16 detects the clamping of the disc 2 by a sensor (not shown) and provides a control signal to the lens drive circuit 30 at a time T1. In response to the control signal, the lens drive circuit 30 makes the focus actuator move the objective lens 72 away from the disc surface 68 at a constant velocity by changing the level of the lens drive signal (Step S2).

When the objective lens 72 reaches a maximum distance from the disc surface 68 at a time T2, the objective lens 72 stops moving (Step S3). When the arrival of the objective lens 72 at the maximum distance is detected, the lens drive circuit 30 provides the reset pulse to the counter 54 and the OR-gate 52. Thus the count value of the counter 54 is reset to zero, the flip-flop 50 is also reset, and the logic value of the output terminal Q becomes "0".

The objective lens 72 then starts moving towards the disc surface 68 in the focus direction at the same time the reset pulse is generated (Step S4). Simultaneously, the reflected beam, that is the light beam reflected by the optical disc 2, is received by each of the photo-diodes 10a–10d. The output signals of each of the photo-diodes 10a–10d are added by the adders 32, 34, and 38 as described above and the added signal is applied to the disc type determining circuit 22 as a read-out signal. The intensity of the reflected beam is measured based on this read-out signal (Step S5).

Figure 6:
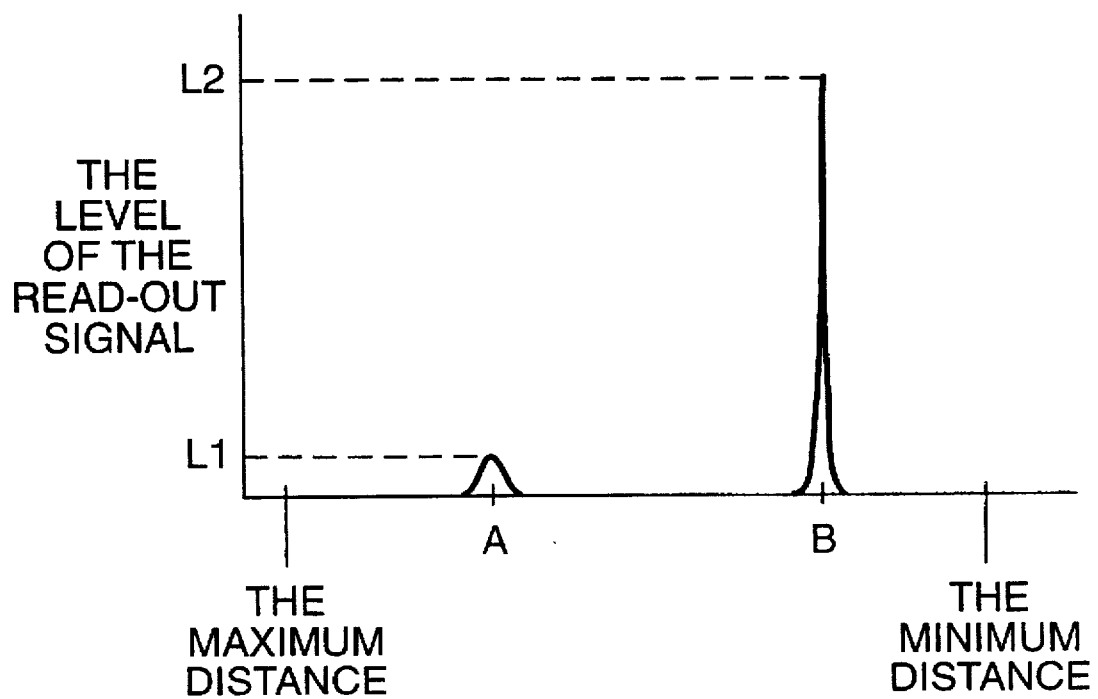
FIG.6 is a graph showing a correlation between the read-out signal level and the distance between the disc surface and the objective lens.

The amplitude of the read-out signal, and thus the intensity of the reflected beam, varies with the distance between the disc surface 68 and the objective lens 72 as shown in FIG.6. In particular, as the objective lens 72 moves in the focus direction towards the disc surface 68 from the maximum distance, and the focal point f of the light beam focused by the objective lens 72 reaches the disc surface 68, the distance between the objective lens 72 and the disc surface 68 approaches A as shown in FIG.3. At this time, most of the light beam 70 permeates through the disc surface 68 because the base plate 62 of the disc 2 is transparent. The disc surface 68, however, reflects a small portion of the light beam 70 which is received by the photo detector 10. Thus, at distance A, the intensity of the reflected beam received by the photo detector 10 has a peak value L1.

As the objective lens 72 continues moving closer to the disc surface 68, the focal point f of the objective lens 72 moves the distance d corresponding to the thickness of the base plate 62 and reaches the reflective surface 66, and thus the information recording surface, of the disc 2. At this moment, the distance between the objective lens 72 and the disc surface 68 reaches B as shown in FIG.3. This situation corresponds to the read-out mode wherein the recording information is ordinary reproduced from the optical disc 2. Therefore, the intensity of the reflected beam received by the photo detector 10 has a peak value L2 which is higher than the peak value L1.

As mentioned above, the intensity of the reflected beam changes depend on the distance between the objective lens 72 and the disc surface 68. Thus, as shown in FIG.5(A)–5(J), when the focal point f of the objective lens 72 reaches the disc surface 68 at a time T3 because of the movement of the objective lens 72 after the time T2, the read-out signal level increases and becomes higher than the level E1 as shown in FIG.5(D) and the comparator 40 provides a logic value "1" to the AND-gate 46. Thus, the logic values of both input signals of the AND-gate 46 become "1", the AND-gate provides a logic value "1" to the input terminal C of the flip-flop 50, and the counter-enable signal is provided from the output terminal of the flip-flop 50 to the counter 54. Therefore, the counter 54 starts counting.

As the objective lens 72 comes even closer to the disc 2, the read-out signal level becomes lower, but the signal level increases again as the focal point f approaches the reflective surface 66 of the disc 2. When the focal point f reaches the reflective surface 66 at a time T4, as shown in FIG.5(D) and FIG.5(F), the read-out signal level becomes higher than the level E2 and the comparator 42 provides a logic value "1" to the MMV 48. Consequently, the MMV 48 provides the reset pulse to the flip-flop 50, and the flip-flop 50 is reset and provides the counter enable signal whose logic value is "0" from the output terminal Q to the counter 54. Thus the counter 54 stops counting. At the same time, as the comparator 42 outputs the logic value "1" to the system controller 16, the system controller 16 recognizes that detection of the two peak values of the read-out signal, and thus detection of the two peak intensities of the reflected beam, is complete.

As mentioned above, when the two peak values of the read-out signal, that is the intensity of the reflected beam, are detected (step S6 in FIG.4), the system controller 16 reads the count value of the counter 54 in response to an input of a logic value "1" from the comparator 42. This count value corresponds to the time interval between T3 and T4.

As shown in FIG.6, the two peak values of the read-out signal level appear at intervals of distance (A–B). Namely, the period of time that the counter 54 counts corresponds to the time it takes for the objective lens 72 to move the distance A–B toward the disc surface 68 at a constant velocity. Therefore, it is considered that the count value in this period corresponds to the actual amount of movement of the objective lens 72 calculated based on the movement velocity of the objective lens 72 and the time interval between the two peak values. This actual amount of movement of the objective lens 72 corresponds to the distance that the focal point f moves from the disc surface 68 to the reflective surface 66, that is the thickness d of the base plate 62. Accordingly, by calculating the actual amount of movement of the objective lens 72 based on the count value (step S7), the distance between the disc surface 68 and the reflective surface 66, and thus the thickness d of the base plate 62 is detected. As the distance between the disc surface 68 and the reflective surface 66 is different depending on the type of the disc 2, the type of the disc 2 is determined based on the count value (step S8).

Therefore, by providing this count value to the system controller 16 as a disc type determining signal which differs according to the type of the disc 2, the system controller 16 determines the type of the disc 2 and provides the signal processing select signal of the disc 2 corresponding to the disc type determining signal provided from the counter 54 to the switch 14. The count value may be converted to another disc type determining signal whose level is different according to the type of disc 2 and provided to the system controller 16.

Moreover, since the input of the disc type determining signal to the system controller 16 also shows that the end of the determining operation of the type of the disc 2 on the turntable 4, the system controller 16 provides a servo select signal to the switch 26 and switches the switch 26 to connect the focus servo circuit 24 and the focus drive circuit 28 to start focus servo control of the objective lens 72 for reading-out the recorded information.

Furthermore, in the embodiment mentioned above, the type of the disc 2 may be determined as the disc 2 rotates. Thus, even if the reflective surface 66 of the optical disc 2 has an uneven surface, for example, because of pits formed in the information recording surface, the type of the disc can still be accurately determined.

In addition, for determining the type of the disc 2, plural count values may be measured by moving the objective lens 72 back and forth a plurality of times in the focus direction while the disc 2 remains stationary or while the disc 2 rotates. Based on an average of these plural count values, the type of the disc 2 can be determined.

As mentioned above, according to the present invention, by moving the objective lens in a focus direction on the side of the recording surface of the optical disc and measuring the actual amount of the movement of the objective lens based on the time interval between two peak values of the reflected beam from the optical disc, the distance between the disc surface and the reflective surface, and thus the type of the disc may be determined easily.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for determining an optical disc type, comprising the steps of:

directing a light beam at an optical disc;

moving a focal point of the light beam in a focus direction with respect to the optical disc;

detecting an intensity of a reflection of the light beam from the optical disc during the step of moving the focal point of the light beam;

detecting a time interval between occurrences of a plurality of peaks of the detected intensity of the reflected light beam; and determining the optical disc type according to the detected time interval.

2. The method of claim 1, wherein the detected time interval corresponds to a distance between a disc surface of the optical disc and a reflective surface of the optical disc.

3. The method of claim 1, wherein the step of detecting the time interval is repeated a plurality of times to detect a plurality of time intervals, and wherein the step of determining the optical disc type determines the disc type according to an average of the plurality of time intervals.

4. The method of claim 1, wherein the step of detecting the time interval is performed during a rotation of the optical disc.

5. The method of claim 3, wherein the step of detecting the plurality of time intervals is performed during a rotation of the optical disc.

6. An apparatus for determining an optical disc type, comprising:

means for directing a light beam at an optical disc;

means for moving a focal point of the light beam in a focus direction with respect to the optical disc;

means for detecting an intensity of a reflection of the light beam from the optical disc during the movement of the focal point of the light beam;

means for detecting a time interval between occurrences of a plurality of peaks of the detected intensity of the reflected light beam; and means for determining the optical disc type according to the detected time interval.

7. The apparatus of claim 6, wherein the detected time interval corresponds to a distance between a disc surface of the optical disc and a reflective surface of the optical disc.

8. The apparatus of claim 6, wherein the means for detecting the time interval repeats the detection of the time interval a plurality of times to detect a plurality of time intervals, and wherein the determining means determining the disc type according to an average of the plurality of time intervals.

9. The apparatus of claim 6, wherein the means for detecting the time interval detects the time interval during a rotation of the optical disc.

10. The apparatus of claim 8, wherein the means for detecting the time interval detects the plurality of time intervals during a rotation of the optical disc.

* * * * *